United States Patent
Kapinos et al.

(10) Patent No.: US 11,467,954 B2
(45) Date of Patent: Oct. 11, 2022

(54) PASSING DATA BETWEEN PROGRAMS USING READ-ONCE MEMORY

(71) Applicant: Lenovo (Singapore) Pte. Ltd., Singapore (SG)

(72) Inventors: Robert J. Kapinos, Durham, NC (US); Scott Wentao Li, Cary, NC (US); Robert Norton, Raleigh, NC (US); Russell Speight VanBlon, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 66 days.

(21) Appl. No.: 17/062,560

(22) Filed: Oct. 3, 2020

(65) Prior Publication Data
US 2022/0107885 A1 Apr. 7, 2022

(51) Int. Cl.
G06F 12/02 (2006.01)
G06F 12/0871 (2016.01)
G06F 9/54 (2006.01)
G06F 11/30 (2006.01)
G06F 11/32 (2006.01)
G06F 12/0891 (2016.01)

(52) U.S. Cl.
CPC ......... *G06F 12/0238* (2013.01); *G06F 9/542* (2013.01); *G06F 11/3037* (2013.01); *G06F 11/328* (2013.01); *G06F 12/0871* (2013.01); *G06F 12/0891* (2013.01)

(58) Field of Classification Search
None
See application file for complete search history.

(56) References Cited

U.S. PATENT DOCUMENTS

| | | | |
|---|---|---|---|
| 6,952,776 B1* | 10/2005 | Chess | G06F 21/564 707/999.103 |
| 7,107,388 B2 | 9/2006 | Zimmer et al. | |
| 2008/0104368 A1* | 5/2008 | Hasegawa | G06F 12/1425 712/14 |
| 2009/0006717 A1* | 1/2009 | Rothman | G06F 11/261 711/102 |
| 2014/0137271 A1* | 5/2014 | Hyde | G06F 12/0238 726/30 |
| 2020/0185037 A1 | 6/2020 | Peeters | |
| 2020/0285037 A1 | 9/2020 | Horstmeyer et al. | |

OTHER PUBLICATIONS

"Container (abstract data type)", Wikipedia, retrieved on Aug. 26, 2020 from https://en.wikipedia.org/wiki/Container_(abstract_data_type).

* cited by examiner

*Primary Examiner* — Charles Rones
*Assistant Examiner* — Ryan Dare
(74) *Attorney, Agent, or Firm* — John M. Rogitz; John L. Rogitz

(57) ABSTRACT

In one aspect, a device may include at least one processor and storage accessible to the at least one processor. The storage may include instructions executable by the at least one processor to allocate, in memory, a read-once memory container to store data from a first computer program. The instructions may also be executable to write the data from the first computer program to the read-once memory container and to permit a second computer program to use the data as stored in the read-once memory container. The data, upon being accessed from the read-once memory container, may not be readable again from the read-once memory container without being written again.

20 Claims, 6 Drawing Sheets

PASSING DATA BETWEEN PROGRAMS USING READ-ONCE MEMORY

FIELD

The present application relates to technically inventive, non-routine solutions that are necessarily rooted in computer technology and that produce concrete technical improvements.

BACKGROUND

As recognized herein, passing secrets between computer programs in memory can be insecure. This might be due to the fact that, in many instances, in order for a process operating in a different memory context to have access to a secret, the secret is to reside in memory while the process context changes. During the time that the secret resides in memory, it may be available to any process with equal security levels and therefore can be snooped by unauthorized programs that might have gained access to the same security level, possibly through privilege escalation. Moreover, in some examples, security levels might need to be relaxed for a memory pass-off to get the secret to its destination. Existing solutions are inadequate as they can require page-sized DMA management, have limits on process I/O, etc.

Accordingly, there are currently no adequate solutions to the foregoing computer-related, technological problem arising in the computer arts.

SUMMARY

Accordingly, in one aspect a device includes at least one processor and storage accessible to the at least one processor. The storage includes instructions executable by the at least one processor to allocate, in memory, a read-once memory container to store data from a first computer program. The instructions are also executable to write the data from the first computer program to the read-once memory container and to permit a second computer program to use the data as stored in the read-once memory container. The data, upon being accessed from the read-once memory container, is not readable again from the read-once memory container without being written again.

In some example implementations, the instructions may be executable to write the data from the first computer program to the read-once memory container and to write a validity indicator associated with the data to the read-once memory container. In these implementations, the instructions may then be executable to permit the second computer program to access the validity indicator and the data, to execute the second computer program to determine that the validity indicator is valid, and to execute the second computer program to use the data to perform a function responsive to the validity indicator being valid.

So, for example, the instructions may be executable to permit the second computer program to access the read-once memory container to read the validity indicator and the data, where the validity indicator may be determined to be valid based on the validity indicator being identified from the read-once memory container.

As another example, the read-once memory container may be a first read-once memory container and the instructions may be executable to permit the second computer program to access a second read-once memory container to read the validity indicator and the data, where the validity indicator may be determined to be valid based on the validity indicator being identified from the second read-once memory container.

In some example embodiments, the validity indicator may include a predetermined bit pattern recognizable by the second computer program as indicating the data as valid. Additionally, or alternatively, the validity indicator may include a digital signature recognizable by the second computer program as indicating the data as valid.

Additionally, in some example implementations the instructions may be executable to take at least one action responsive to the validity indicator being either invalid or not identified by the second computer program. So, for example, the at least one action may include one or more of executing a malware scan, transmitting a notification indicating the validity indicator as being either invalid or not identified by the second computer program, making an entry in a computer fault log indicating the validity indicator as being either invalid or not identified by the second computer program, requesting that the first computer program make the data available again, requesting that the first computer program refrain from making the data available again, and/or concealing data indicating the validity indicator as being either invalid or not identified by the second computer program.

In some non-limiting examples, the memory may not be writeable again after one read.

Still further, in some examples the data may be first data, and upon being read a first time the first data may be replaced with second data different from the first data. The second data may include all zeros, all ones, randomly serialized zeros and ones, or a repeating pattern of zeros and ones.

In some example implementations, a trusted platform module (TPM) and/or dedicated memory controller may be used to allocate, in the memory, the read-once memory container. In other example implementations, an operating system of the device may be used to allocate, in the memory, the read-once memory container.

In another aspect, a method includes allocating, in memory, a read-once memory container to store data from a first computer program. The method also includes writing the data from the first computer program to the read-once memory container. The method then includes permitting a second computer program to use the data as stored in the read-once memory container. The data, upon being accessed from the read-once memory container, is not readable again from the read-once memory container without being written again.

Thus, in some example implementations the method may include writing the data from the first computer program to the read-once memory container and writing a validity indicator associated with the data to the read-once memory container. In these implementations the method may then include permitting the second computer program to access the validity indicator and the data, executing the second computer program to determine that the validity indicator is valid, and executing the second computer program to use the data to perform a function responsive to the validity indicator being valid.

In some examples, the method may include triggering a virus scan responsive to determining that the validity indicator is not valid. Additionally, or alternatively, the method may include presenting on a display a notification regarding the data validity indicator not being valid responsive to determining that the validity indicator is not valid.

Additionally, in some implementations the data may be encrypted as written to the read-once memory container.

In still another aspect, at least one computer readable storage medium (CRSM) that is not a transitory signal includes instructions executable by at least one processor to allocate, in memory, a read-once memory container to store data from a first computer program. The instructions are also executable to write the data from the first computer program to the read-once memory container and to permit a second computer program to use the data as stored in the read-once memory container. The data, upon being accessed from the read-once memory container, is not readable again from the read-once memory container without being written again.

In some examples, the read-once memory container may be in a storage area that is different from main random-access memory (RAM) in a device housing both the storage area and the main RAM.

The details of present principles, both as to their structure and operation, can best be understood in reference to the accompanying drawings, in which like reference numerals refer to like parts, and in which:

DETAILED DESCRIPTION

Figure 1:
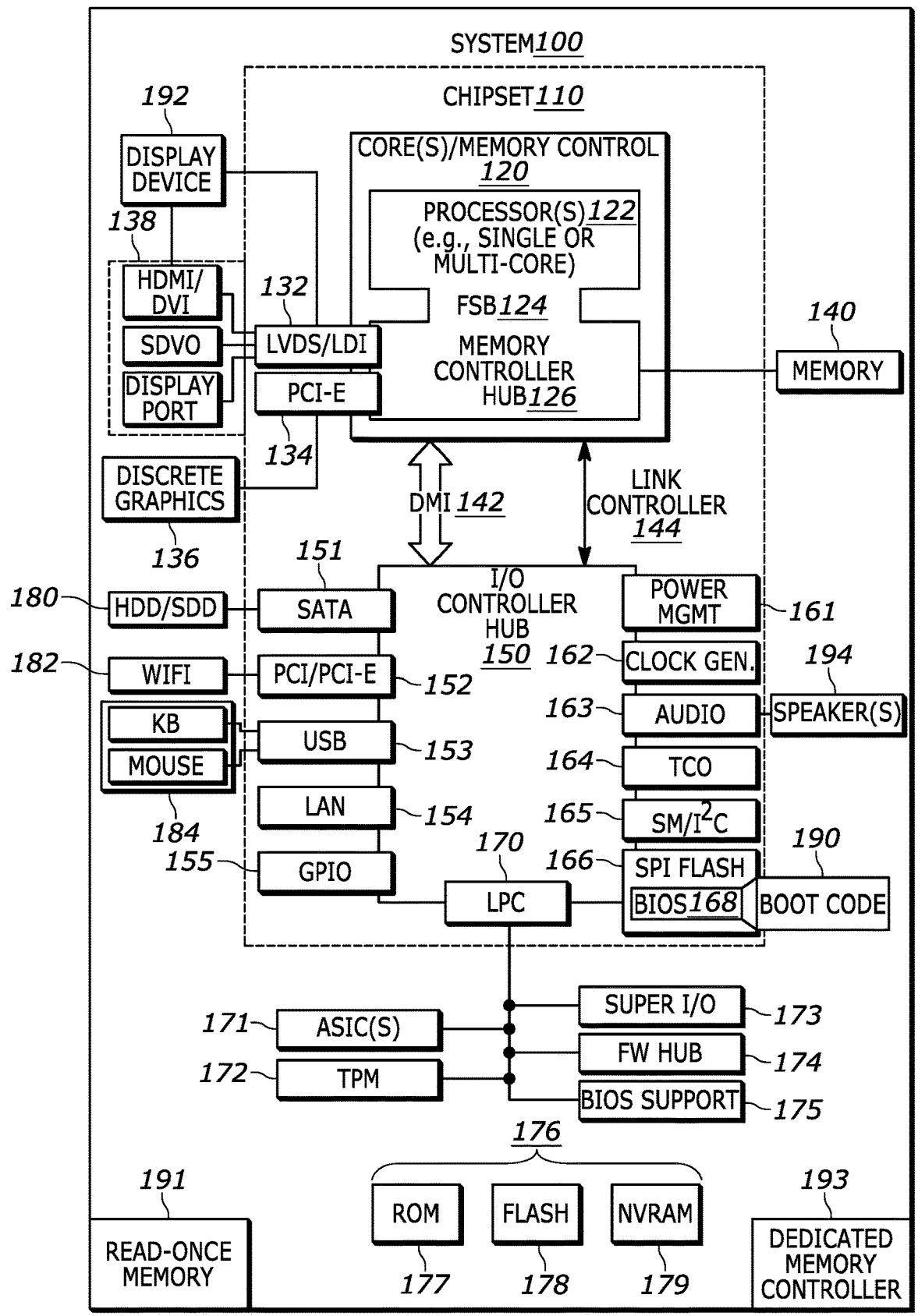
FIG. 1 is a block diagram of an example system consistent with present principles.

The present disclosure deals with use of read-once memory that may consist of or include an electric charge storing device that can destroy its internal charge state when that charge state is retrieved. The internal charge state of such a device may go to all zeroes, or all ones, in a register when it is read. In some examples, only the creator of such a piece of data can write it.

Thus, consistent with present principles a computer may be equipped with a bank of read-once memory. This memory may be allocated in shared mode by programs as other memory may be allocated. A unique API or mode may trigger the memory from being read-write to read-once. When one program wants to pass a secret to another program, it may allocate/write to a shared region of read-once memory. The first program may fill the memory with a secret as well as an eyecatcher or flag that may not ever match the memory after reading.

The second program receiving the secret may check the eyecatcher or flag. If the eyecatcher or flag exists, this may indicate that the secret is sound/secure and has not been stolen. If the eyecatcher is missing, this may indicate that the secret is invalid and appropriate action may be taken by the second program expecting to get the secret.

In some example embodiments, a TPM or dedicated memory controller can initialize and manage the read-once memory with secrets.

Also, in some example embodiments, a contrived value might be placed into the memory as an additional safeguard.

Still further, in some example embodiments, the read-once bits may lie outside the data memory and (e.g., only) be used as a tamper-proofing indicator.

Additionally, in some example embodiments, the owning program may write to the memory once. In other example embodiments it may be required to be done through a proxy. Writing multiple times may not be possible.

Accordingly, a device can issue read-once memory to a first application, and the first application can write a secret to it. A second application may then read the read-once memory (thus destroying it) and validate the secret has been successfully read. Appropriate action may be taken upon getting an invalid secret, as that may be evidence of unauthorized tampering.

Prior to delving further into the details of the instant techniques, note with respect to any computer systems discussed herein that a system may include server and client components, connected over a network such that data may be exchanged between the client and server components. The client components may include one or more computing devices including televisions (e.g., smart TVs, Internet-enabled TVs), computers such as desktops, laptops and tablet computers, so-called convertible devices (e.g., having a tablet configuration and laptop configuration), and other mobile devices including smart phones. These client devices may employ, as non-limiting examples, operating systems from Apple Inc. of Cupertino Calif., Google Inc. of Mountain View, Calif., or Microsoft Corp. of Redmond, Wash. A Unix® or similar such as Linux® operating system may be used. These operating systems can execute one or more browsers such as a browser made by Microsoft or Google or Mozilla or another browser program that can access web pages and applications hosted by Internet servers over a network such as the Internet, a local intranet, or a virtual private network.

As used herein, instructions refer to computer-implemented steps for processing information in the system. Instructions can be implemented in software, firmware or hardware, or combinations thereof and include any type of programmed step undertaken by components of the system; hence, illustrative components, blocks, modules, circuits, and steps are sometimes set forth in terms of their functionality.

A processor may be any general-purpose single- or multi-chip processor that can execute logic by means of various lines such as address lines, data lines, and control lines and registers and shift registers. Moreover, any logical blocks, modules, and circuits described herein can be implemented or performed with a general purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can also be implemented by a controller or state machine or a combination of computing devices. Thus, the methods herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may also be embodied in a non-transitory device that is being vended and/or provided that is not a transitory, propagating signal and/or a signal per se (such as a hard disk drive, CD ROM or Flash drive). The software code instructions may also be downloaded over the Internet. Accordingly, it is to be understood that although a software application for undertaking present principles may be vended with a device such as the system 100 described below, such an application may also be downloaded from a server to a device over a network such as the Internet.

Software modules and/or applications described by way of flow charts and/or user interfaces herein can include various sub-routines, procedures, etc. Without limiting the disclosure, logic stated to be executed by a particular module can be redistributed to other software modules and/or combined together in a single module and/or made available in a shareable library.

Logic when implemented in software, can be written in an appropriate language such as but not limited to hypertext markup language (HTML)-5, Java®/JavaScript, C# or C++, and can be stored on or transmitted from a computer-readable storage medium such as a random access memory (RAM), read-only memory (ROM), a hard disk drive or solid state drive, removable thumb drives, etc.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged, or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

The term "circuit" or "circuitry" may be used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Now specifically in reference to FIG. 1, an example block diagram of an information handling system and/or computer system 100 is shown that is understood to have a housing for the components described below. Note that in some embodiments the system 100 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a client device, a server or other machine in accordance with present principles may include other features or only some of the features of the system 100. Also, the system 100 may be, e.g., a game console such as XBOX®, and/or the system 100 may include a mobile communication device such as a mobile telephone, notebook computer, and/or other portable computerized device.

As shown in FIG. 1, the system 100 may include a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM) such as main and/or general-purpose RAM. It is often referred to as "system memory."

The memory controller hub 126 can further include a low-voltage differential signaling interface (LVDS) 132. The LVDS 132 may be a so-called LVDS Display Interface (LDI) for support of a display device 192 (e.g., a CRT, a flat panel, a projector, a touch-enabled light emitting diode display or other video display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (×16) PCI-E port for an external PCI-E-based graphics card (including, e.g., one of more GPUs). An example system may include AGP or PCI-E for support of graphics.

In examples in which it is used, the I/O hub controller 150 can include a variety of interfaces. The example of FIG. 1 includes a SATA interface 151, one or more PCI-E interfaces 152 (optionally one or more legacy PCI interfaces), one or more USB interfaces 153, a LAN interface 154 (more generally a network interface for communication over at least one network such as the Internet, a WAN, a LAN, a Bluetooth network using Bluetooth 5.0 communication, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes basic input/output system (BIOS) 168 and boot code 190. In some examples, BIOS may be a set of routines stored in read-only memory that enable a computer to start an operating system and to communicate with the various devices in a system, such as disk drives, keyboard, monitor, printer, and communications ports. In one example embodiment, functions performed by BIOS may also be performed by other higher-level software application programs. In another embodiment, BIOS may be a Unified Extensible Firmware Interface (UEFI), which assists in control handoff of a computer system to an operating system during a pre-boot environment (e.g., after the computer system is powered on, but before the operating system starts).

With respect to network connections, the I/O hub controller 150 may include integrated gigabit Ethernet controller lines multiplexed with a PCI-E interface port. Other network features may operate independent of a PCI-E interface. The interfaces of the I/O hub controller 150 may provide for communication with various devices, networks, etc. For example, where used, the SATA interface 151 provides for reading, writing or reading and writing information on one or more drives 180 such as HDDs, SDDs or a combination thereof, but in any case the drives 180 are understood to be, e.g., tangible computer readable storage mediums that are not transitory, propagating signals. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system. The TPM 172 can also be used as disclosed below consistent with present principles.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

As also shown in FIG. 1, the system 100 may include read-once memory, destructive readout memory, and/or destructive memory 191. In some examples, the read-once memory 191 may be established by dynamic RAM or ferroelectric RAM. Regardless, the memory 191 may establish a memory device that is different from general-purpose memory and/or main memory also housed within the system 100, such as the memory 140 and/or non-volatile RAM (NVRAM) 179.

The memory 191 may be configured so that, for example, the reading out of data that it contains results in the erasing or destruction of the data itself from the memory 191 upon reading. Thus, the data, upon being accessed or read from the memory 191, is not readable again from the memory 191 without being written again.

Still further, note that in some example embodiments the system 100 may include a dedicated memory controller 193 for managing and controlling the read-once memory 191, including controlling read and write operations.

Additionally, though not shown for simplicity, in some embodiments the system 100 may include a gyroscope that senses and/or measures the orientation of the system 100 and provides related input to the processor 122, as well as an accelerometer that senses acceleration and/or movement of the system 100 and provides related input to the processor 122. Still further, the system 100 may include an audio receiver/microphone that provides input from the microphone to the processor 122 based on audio that is detected, such as via a user providing audible input to the microphone. The system 100 may also include a camera that gathers one or more images and provides images and related input to the processor 122. The camera may be a thermal imaging camera, an infrared (IR) camera, a digital camera such as a webcam, a three-dimensional (3D) camera, and/or a camera otherwise integrated into the system 100 and controllable by the processor 122 to gather pictures/images and/or video. Also, the system 100 may include a global positioning system (GPS) transceiver that is configured to communicate with at least one satellite to receive/identify geographic position information and provide the geographic position information to the processor 122. However, it is to be understood that another suitable position receiver other than a GPS receiver may be used in accordance with present principles to determine the location of the system 100.

It is to be understood that an example client device or other machine/computer may include fewer or more features than shown on the system 100 of FIG. 1. In any case, it is to be understood at least based on the foregoing that the system 100 is configured to undertake present principles.

Figure 5:
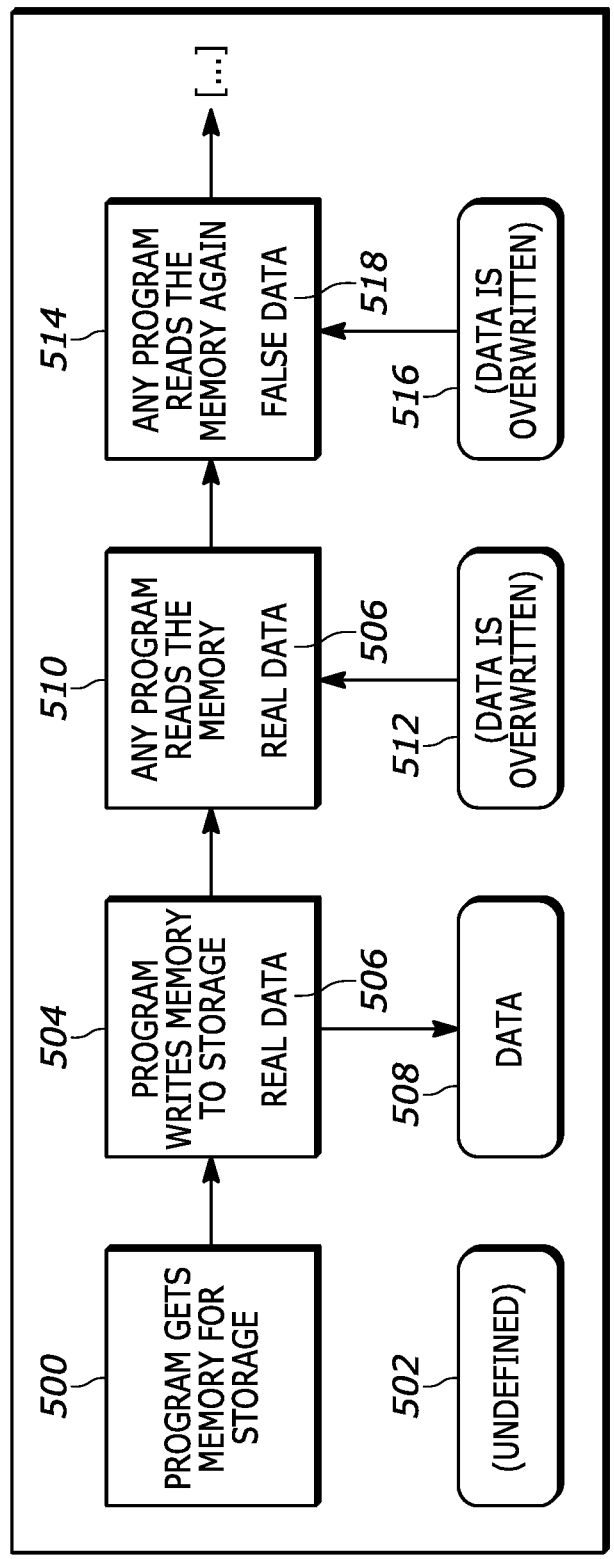
FIG. 5 shows a schematic flowchart of how different computer programs can interact with read-once memory to pass secret data consistent with present principles.

Reference is now made to FIG. 5, which shows a schematic flowchart of how different computer programs can interact with read-once memory to pass secret data consistent with present principles. Thus, the top row of FIG. 5 shows the process executed by a device operating consistent with present principles, while the bottom row shows a schematic of the current data state of an associated read-once memory area being used by the process.

Accordingly, at step 500 a first program may get undefined memory 502 allocated to it for storing a secret or other data. The process may then flow to block 504 where the first program may write secret or other real/true data 506 to the allocated memory area 508.

From block 504 the process may then flow to block 510 where a second program may read the memory area to access the real data 506, which in turn may cause the memory area's real data 506 to be overwritten 512 with other data. From block 510 the process may then flow to block 514 where an additional program may attempt to read the memory area again with the real data 506 still overwritten 516, resulting in false data 518 being readout instead by the additional program (rather than reading out the real data/actual secret 506). The additional program may be a third program different from the first and second programs, or may even be one of the first and second programs itself should that program attempt to readout the read-once memory again at step 514.

Figure 2:
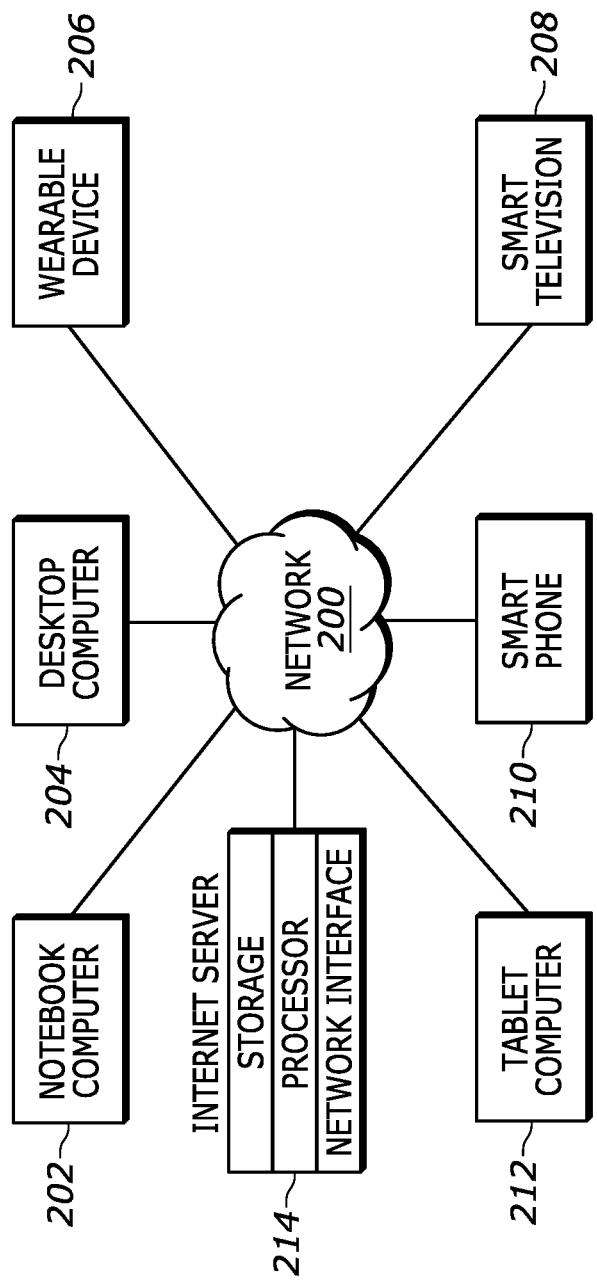
FIG. 2 is a block diagram of an example network of devices consistent with present principles.

Turning now to FIG. 2, example devices are shown communicating over a network 200 such as the Internet in accordance with present principles if, e.g., computer programs being executed consistent with present principles are being executed on different devices to pass secrets amongst each other (e.g., in a secure or wired master/slave relationship). It is to be understood that each of the devices described in reference to FIG. 2 may include at least some of the features, components, and/or elements of the system 100 described above. Indeed, any of the devices disclosed herein may include at least some of the features, components, and/or elements of the system 100 described above.

FIG. 2 shows a notebook computer and/or convertible computer 202, a desktop computer 204, a wearable device 206 such as a smart watch, a smart television (TV) 208, a smart phone 210, a tablet computer 212, and a server 214 such as an Internet server that may provide cloud storage accessible to the devices 202-212. It is to be understood that the devices 202-214 may be configured to communicate with each other over the network 200 consistent with present principles.

Figure 3:
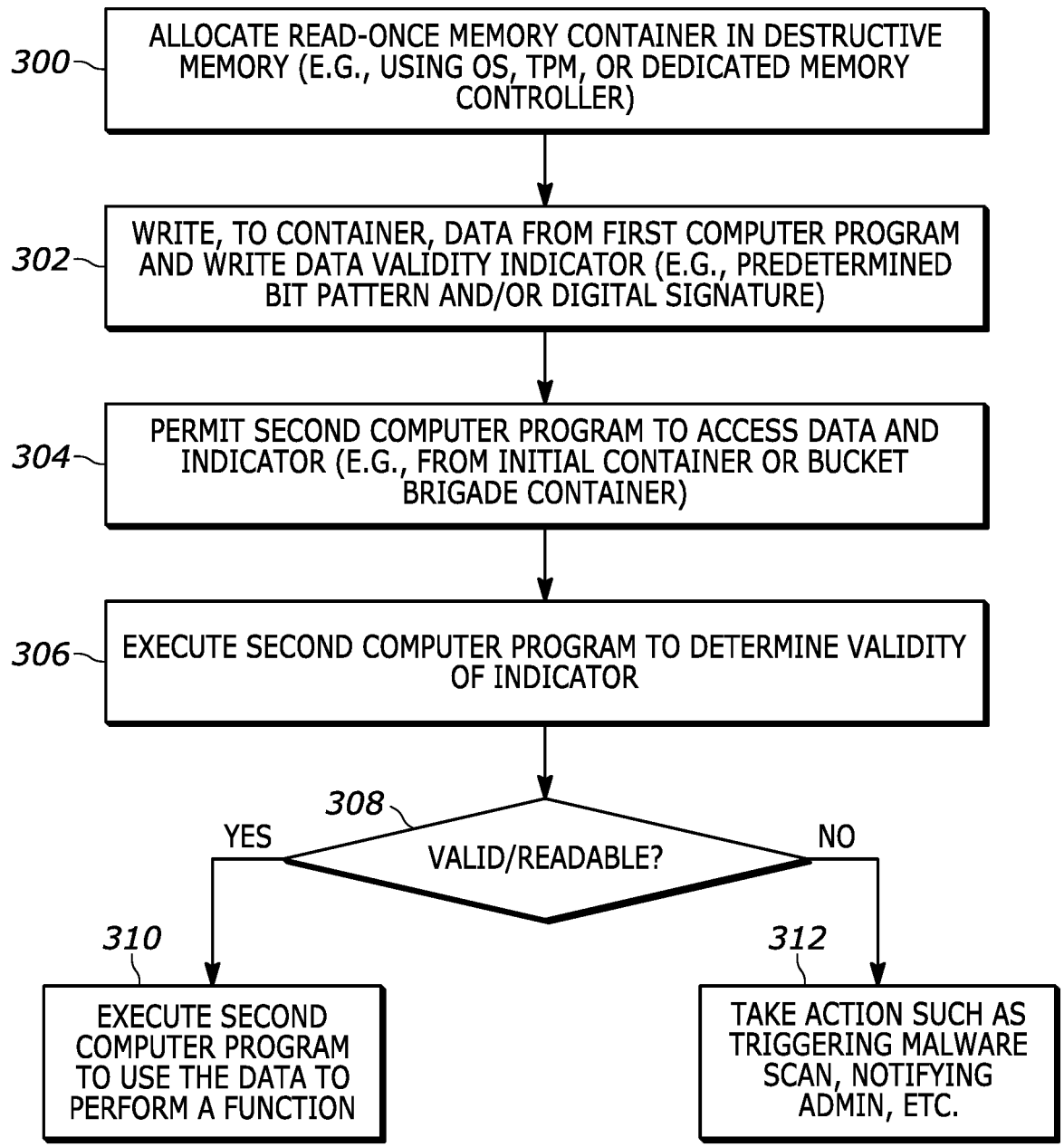
FIG. 3 is a flow chart of an example algorithm consistent with present principles.

Referring to FIG. 3, it shows example logic that may be executed by a device such as the system 100 in accordance with present principles. Beginning at block 300, the device may allocate a portion of read-once and/or destructive memory in the device as a memory container for certain data. The device may do so using its native operating system (e.g., BIOS) or a guest operating system (e.g., Windows, Linux, or Mac OS). Additionally or alternatively, the device may do so using a trusted platform module (TPM) such as the TPM 172 described above, a dedicated memory controller such as the controller 193 described above, or even a unique application programming interface (API) specifically developed for executing some or all of the logic of FIG. 3.

Additionally, note that in some examples at block 300 and prior to allocating the portion or container, the API may trigger the memory from being read-write to being read-once.

From block 300 the logic may then proceed to block 302. At block 302 the device may write, to the container/allocated portion of the read-once memory, data from a first computer program. The data may include a secret to be passed from the first computer program to a second computer program for use by the second computer program. For example, the data may include encryption/decryption keys, personal user information such as social security numbers and bank account numbers, confidential electronic documents, data objects (e.g., proprietary ones), computer parameters, security codes, login credentials and other secret information to access electronic resources, etc. Additionally, as an added layer of security the data may be encrypted as stored in the container/allocated portion so that it can be decrypted by the second computer program with the appropriate decryption key once accessed from the container/allocated portion.

Also, at block 302, the device may write, to the container/allocated portion of the read-once memory, a data validity indicator. The indicator may be, for example, a seemingly but not actually random bit pattern or contrived value previously determined by the device's guest operating system (GOS) (or TPM or even unique API) for the first and second programs to use and/or recognize. The predetermined bit pattern may have also been previously agreed-upon between the first and second computer programs themselves for use in passing secret data between them consistent with present principles. The bit pattern may be, for example, the number 113 or 2384095.

Other types of data validity indicators may also be used. For example, a predetermined byte pattern may be used, or a digital signature associated with the first program providing the data as generated using an encryption key assigned to the first computer program for creating digital signatures.

From block 302 the logic may then proceed to block 304. At block 304 the device may permit the second computer program to at least attempt to access the secret data and data validity indicator as stored in the container, and/or attempt to access those items as stored in a copy or new version of the container (e.g., if the device's GOS previously read the data in the process of a bucket brigade and hence had to write the data again to read-once memory after being destructively read).

From block 304 the logic may proceed to block 306. At block 306 the device may execute the second computer program for the second computer program to determine the validity of the indicator. Since the indicator itself that the second computer program knows it should be able to identify has already been provided to the second computer program, either as a predetermined bit pattern or known digital signature of the first computer program or otherwise, at diamond 308 the second computer program may determine whether the indicator is it has read out from the read-once memory container is valid and/or readable.

If the device/second computer program determines at diamond 308 that the indicator is valid (e.g., matches an expected bit pattern or is able to identify the correct digital signature), the logic may proceed to block 310 where the device may execute the second computer program to use the accompanying data to perform a function. The function may be, for example, logging a user in to an online service or email account using a username and password from the data. As another example, the function may be the second computer program submitting a security code for login to an account as part of a two-factor login authentication, where the security code was stored in the read-once memory by a text messaging application (the first computer program in this case) once received over short messaging service (SMS) communication. Secure or proprietary data objects or images might also be presented using the second computer program as part of the function, and/or an encryption key stored in the container may be used to encrypt data communications with other devices as generated by the second computer program.

However, if no indicator is readable at all, resulting in an invalid determination at diamond 308, the logic may proceed to block 312 since that may be an indication that a program or something else that was not approved has already read or compromised the data, resulting in its destruction from the read-once memory.

Or, if an imposter or invalid/incorrect indicator is read (e.g., returning "null"), that too may result in an invalid determination where the logic may proceed to block 312. An invalid or incorrect indicator that exists in the container (since the nefarious program might not know the true indicator to include it again) may be an indication that the true indicator and/or secret data were already read by an unauthorized entity that then attempted (possibly with root privileges) to recreate the container to fool the second computer program with different secret data or to conceal the fact that it has read the data (and hence destroyed it during reading, resulting in the need to recreate the container so that the second program might still access the data).

At block 312 itself, the device/second computer program may take an action such as triggering a virus or malware scan using antivirus or other software in an attempt to locate and remove a nefarious program or trojan horse with which the device may have been infected and which read the read-once memory container without approval. Other example actions that may be executed at block 312 include transmitting a notification to a user or system administrator indicating that the data validity indicator was invalid/not identified by the second computer program, autonomously fixing the problem and making an entry in a computer fault log indicating the validity indicator as being invalid/not identified by the second computer program, and/or sending a message to the first computer program that data did not reach the second computer program and requesting that the first computer program make the data available again.

In some examples, the action may even include sending a notification to the first computer program that the data did not reach the second computer program but requesting that the first computer program refrain from making the secret data available again since the data might be intercepted or exposed or compromised again upon another attempt. For similar reasons, the action may include concealing other data (e.g., data that might otherwise go into a fault log) that would indicate the validity indicator as being either invalid/not identified by the second computer program.

Additionally, or alternatively, at block 312 the OS may be notified through a bad memory read error.

As another example, the second computer program may notify the first computer program that the second program cannot establish a high security connection and therefore the two programs should only exchange data and communications in a low security mode. Such a notification might also include an indication to the first computer program to be aware that the first program's data handoffs may be intercepted.

Figure 4:
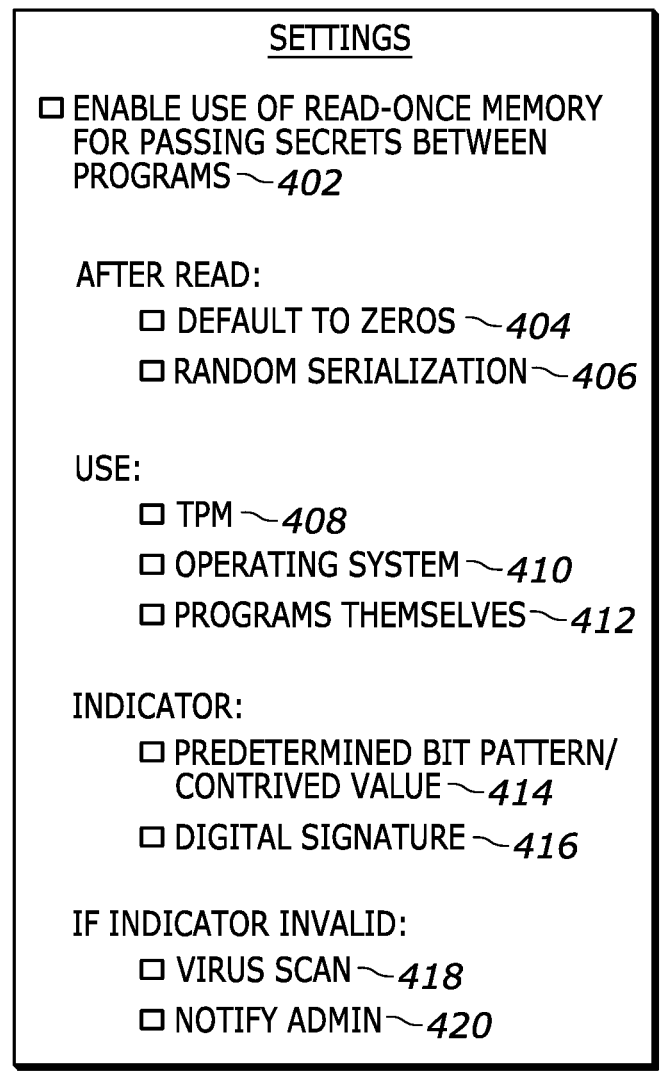
FIG. 4 shows an example graphical user interface that may be presented on the display of a device to configure one or more settings of the device to operate consistent with present principles.

Now describing FIG. 4, it shows an example graphical user interface (GUI) 400 that may be presented on the display of a device with read-once memory or that may be presented on another device in communication therewith. The GUI 400 may be presented upon request by, for example, a user or system administrator who has logged in to the device with administrator privileges in order to configure one or more settings of the device to operate consistent with present principles. Note that each option to be discussed below may be selected by directing touch or cursor input to the respective check box adjacent to the respective option.

As shown in FIG. 4, the GUI 400 may include a first option 402 that may be selected to set or enable the device to use read-once memory for passing secrets between computer programs. For example, the first option 402 may be selected to set or configure the device to, in the future, undertake the logic of FIG. 3.

The GUI 400 may also include options 404, 406 to either destruct re-once memory secrets into all zeros upon readout (option 404) or to store a random serialization of zeros and ones (e.g., as other read-once data) to replace a secret passed between programs (option 406). Other options may also be presented though not shown for clarity, such as an option to replace a secret in read-once memory with all ones upon readout and an option to replace a secret with an alternating or repeating pattern of zeros and ones upon readout.

As also shown in FIG. 4, the GUI 400 may include options 408-412. Option 408 may be selected to set or configure the device to use a TPM to initialize and manage read-once memory for storing secret data. Option 410 may be selected to instead set or configure the device to use the device's guest operating system. Additionally, option 412 may be selected to set or allow the individual programs themselves to initialize and manage read-once memory for storing secret data (e.g., software "apps" like email apps, social networking apps, encryption apps, medical provider apps, etc.). Though not shown, another option to use a dedicated memory controller may also be presented.

Additionally, in some examples the GUI 400 may include options 414, 416 for selecting a particular type of data validity indicator to use. Thus, option 414 may be selected to set or enable the device to use a predetermined bit pattern or contrived value, while option 416 may be selected to set or enable the device to use digital signatures. Options may also be presented for other available data validity indicators.

Still further, the GUI 400 may include options for selecting various actions the device or a computer program is to take responsive to a determination that an indicator is invalid. Option 418 may therefore be selected to set or configure the device to run a virus scan as an action to take, while option 420 may be selected to set or configure the device to notify a system administrator by, e.g., sending an email to an email account associated with the system administrator or presenting a message on the display of the device. More than one option for actions to take may be selected at one time, and although only two are shown on the GUI 400 for simplicity other options such as those discussed herein may be listed as well.

Further describing a bucket brigade as referenced above, a device undertaking present principles may setup a bucket brigade where a good actor like the device's guest or native operating system may manage read-once memory to give a program some read-once memory in which to put secrets. The program may then store the secrets in the read-once memory container (or "bucket") allocated to it, and the OS may then transfer the bucket having the indicator and the secret around the OS to other programs and APIs, or even hand off it off to or over a network, with the secret and indicator still residing in the read-once memory with each handoff. But each time the bucket gets picked up by the device's CPU/OS at another point on pass-off, the CPU/OS may validate the indicator and recreate/copy the "bucket" by re-storing the valid indicator and secret that were read from the read-once memory as a result of the handoff (after insuring the water was not "dropped" from the bucket by an unauthorized program tampering or accessing the read-once memory bucket and thus destroying the secret data and/or indicator before the OS picked up the bucket again).

Thus, no matter how many times the "bucket" may be passed between processes to an ultimate destination program (e.g., the second computer program of FIG. 3), the CPU/OS can check each time there is a handoff between processes, devices, etc. to make sure the "water" is still in the bucket when the bucket gets passed. If "water" is determined to have been dumped out, the CPU/OS can trigger a malware scan, flag an operator/admin that malware was detected, trigger an entry in a computer fault log, etc.

If the "water" was not dumped out, the CPU/OS may copy the previous bucket/container so that it is available to the next link in the bucket brigade. In various examples, this may be possible due to the fact that the OS could be running at the highest level of privileges and can therefore see everything, ask for as much read-once memory as it wants, and manage the read-once memory according to the above. However, still note that the individual computer programs themselves may additionally or alternatively do the reading from and writing to read-once memory for handoffs amongst each other (e.g., direct handoffs) once granted permission by the OS consistent with the present principles.

Figure 6:
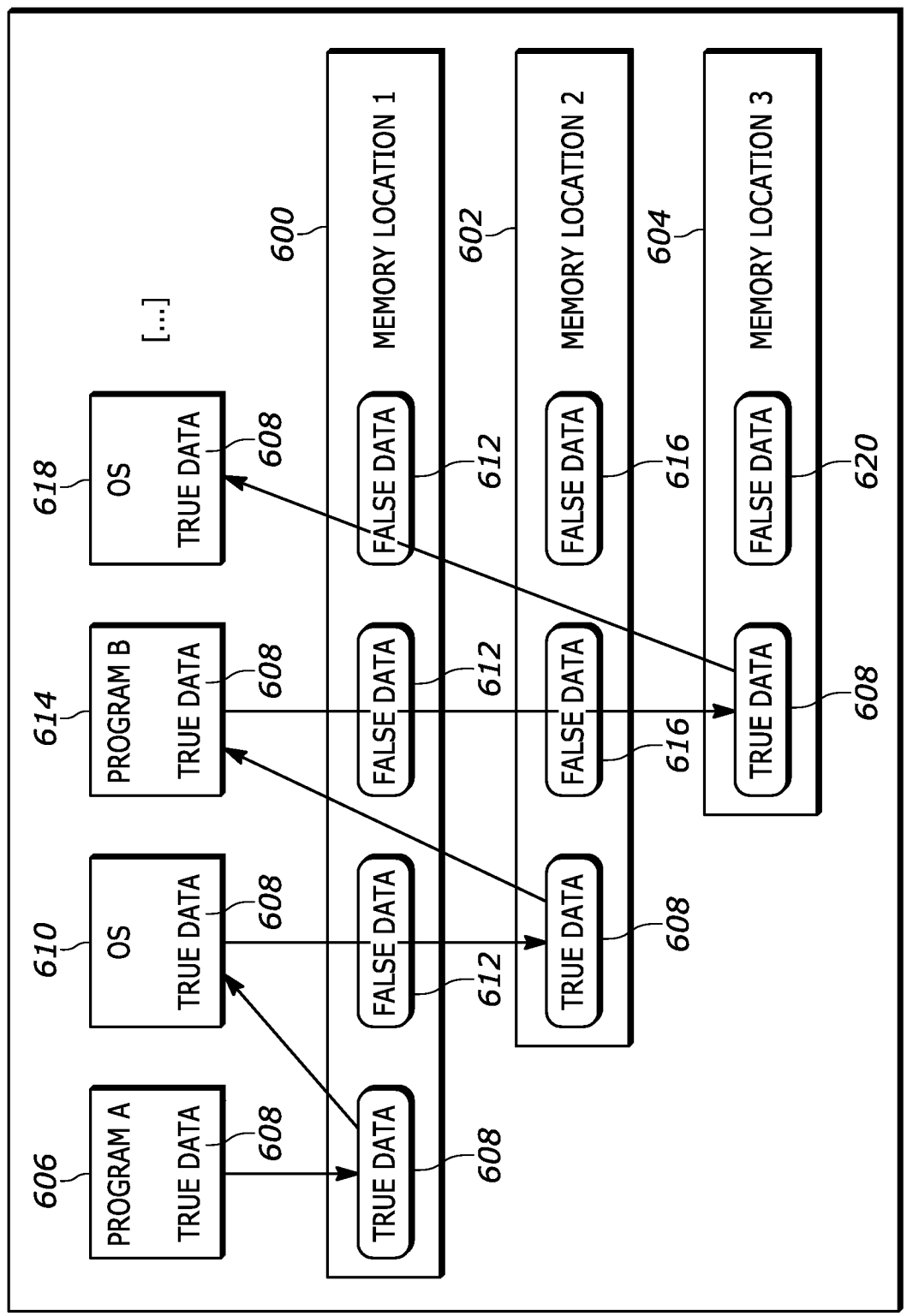
FIG. 6 shows a schematic diagram of an example bucket brigade implementation consistent with present principles.

An example schematic diagram of a bucket brigade implementation is shown in FIG. 6. As shown, a first discrete read-once memory location/container 600, a second discrete read-once memory location/container 602, and a third discrete read-once memory location/container 604 may have different data states at different steps in the process as will now be described.

At 606, a first program may write true data 608 (e.g., secret data to be passed to another program) to the first location 600. Then at 610 the device's guest operating system itself may readout the true data 608 from the location 600, resulting in false data 612 overwriting the true data 608 in the location 600, and then write the true data 608 to location 602.

Thereafter, at 614 a second program may readout the true data 608 from location 602, resulting in false data 616 overwriting the true data 608 in the location 602. The false data 616 may be the same as or different from the false data 612 as still maintained in location 600 as shown. Also, at 614, the second program may then write the true data 608 to location 604.

The bucket brigade process may then continue in similar fashion until the true data 608 reaches its ultimate destination program. For example, at 618 the guest operating system may again access the true data 608, this time by reading it out from the location 604, which in turn may result in false data 620 being overwritten into the location 604 where the true data 608 was formerly residing in the area 604 as stored by the second program. Again, the false data 620 may be the same as or different from the false data 612, 616.

Note that although not explicitly shown in FIG. 6, a validity indicator as described herein may also be written to the respective location 600, 602, or 604 each time the true data 608 is written into the same respective location. Also note that each time the true data 608 is read out from the respective location, the validity indicator as stored at that respective location may also be validated.

Also note consistent with present principles that in some examples, read-once bits might lie outside the device's normal memory in that a first program might just write to protected main or general-purpose memory, and the device's OS itself may then transfer the data to a read-once memory container in separate read-once memory. Then when a receiving/second program makes request for the container, the OS may transfer the container to the receiving program's allocated main memory area so the second program can access the data immediately or within a threshold time of the transfer (before a nefarious program might locate and attempt to access it). Thus, the OS may use the read-once memory as a copy location where it moves secrets until requested by a good actor program, transferring secrets in and out as appropriate. In such an example implementation, the individual first and second computer programs themselves might not ever know the secrets were passed through the read-once memory.

Further still, even if the OS itself does not use the read-once memory as a copy location according to the paragraph immediately above, it might use a proxy to do so. For example, a first computer program or app might call on an OS service or other program and request that certain secret data be put in a read-once memory container for transfer to another program, and so the requesting program might still not deal directly with the read-once memory and instead an OS proxy API would do so. In this case, the proxy API would be tasked with management of the read-once memory, e.g., without the sending and/or receiving program being configured for reading or writing to read-once memory.

It may now be appreciated that present principles provide for an improved computer-based program interface that improves the functionality and security of the devices disclosed herein. The disclosed concepts are rooted in computer technology for computers to carry out their functions.

It is to be understood that whilst present principals have been described with reference to some example embodiments, these are not intended to be limiting, and that various alternative arrangements may be used to implement the subject matter claimed herein. Components included in one embodiment can be used in other embodiments in any appropriate combination. For example, any of the various components described herein and/or depicted in the Figures may be combined, interchanged, or excluded from other embodiments.

What is claimed is:

1. A device, comprising:
at least one processor; and
storage accessible to the at least one processor and comprising instructions executable by the at least one processor to:
allocate, in memory, a read-once memory container to store data from a first computer program;
write the data from the first computer program to the read-once memory container;
permit a second computer program to, within a threshold time of the data being written to the read-once memory container, use the data as stored in the read-once memory container, wherein the data, upon being accessed from the read-once memory container, is not readable again from the read-once memory container without being written again; and
responsive to the threshold time ending without the second computer program accessing the data from the read-once memory container, remove the data from the read-once memory container.

2. The device of claim 1, wherein the instructions are executable to:
write the data from the first computer program to the read-once memory container and write a validity indicator associated with the data to the read-once memory container;
permit the second computer program to access the validity indicator and the data;
execute the second computer program to determine that the validity indicator is valid; and
responsive to the validity indicator being valid, execute the second computer program to use the data to perform a function.

3. The device of claim 2, wherein the instructions are executable to:
permit the second computer program to access the read-once memory container to read the validity indicator and the data, wherein the validity indicator is determined to be valid based on the validity indicator being identified from the read-once memory container.

4. The device of claim 2, wherein the read-once memory container is a first read-once memory container, and wherein the instructions are executable to:
permit the second computer program to access a second read-once memory container to read the validity indicator and the data, wherein the validity indicator is determined to be valid based on the validity indicator being identified from the second read-once memory container, the second read-once memory container being different from the first read-once memory container, the device transferring the data from the first read-once memory container to the second read-once memory container as part of a bucket brigade, the first device transferring the data from the first read-once memory container to the second read-once memory container responsive to validating the validity indicator from the first read-once memory container.

5. The device of claim 2, wherein the validity indicator comprises a predetermined byte pattern recognizable by the second computer program as indicating the data as valid.

6. The device of claim 2, wherein the validity indicator comprises a digital signature recognizable by the second computer program as indicating the data as valid, the digital signature being generated using an encryption key.

7. The device of claim 2, wherein the instructions are executable to:
responsive to the validity indicator being either invalid or not identified by the second computer program, make an entry in a computer fault log indicating the validity indicator as being either invalid or not identified by the second computer program.

8. The device of claim 2, wherein the instructions are executable to:
responsive to the validity indicator being either invalid or not identified by the second computer program, request that the first computer program make the data available again.

9. The device of claim 2, wherein the instructions are executable to:
responsive to the validity indicator being either invalid or not identified by the second computer program, conceal data indicating the validity indicator as being either invalid or not identified by the second computer program.

10. The device of claim 2, wherein the instructions are executable to:
responsive to the validity indicator being either invalid or not identified by the second computer program, request that the first computer program refrain from making the data available again.

11. The device of claim 2, wherein the instructions are executable to:
responsive to the validity indicator being either invalid or not identified by the second computer program, send an email to a system administrator.

12. The device of claim 1, wherein a trusted platform module (TPM) is used to allocate, in the memory, the read-once memory container.

13. The device of claim 1, wherein the data is encrypted as written to the read-once memory container.

14. The device of claim 1, wherein the instructions are executable to:
responsive to the threshold time ending without the second computer program accessing the data from the read-once memory container, transfer the data out of the read-once memory container.

15. At least one computer readable storage medium (CRSM) that is not a transitory signal, the computer readable storage medium comprising instructions executable by at least one processor to:
allocate, in memory, a read-once memory container to store data from a first computer program;
write the data from the first computer program to the read-once memory container;
permit a second computer program to, within a threshold time of the data being written to the read-once memory container, use the data as stored in the read-once memory container, wherein the data, upon being accessed from the read-once memory container, is not readable again from the read-once memory container without being written again; and
responsive to the threshold time ending without the second computer program accessing the data from the read-once memory container, remove the data from the read-once memory container.

16. The CRSM of claim 15, wherein the instructions are executable to:
encrypt the data prior to writing the data as encrypted to the read-once memory container.

17. The CRSM of claim 15, wherein the instructions are executable to:
write the data from the first computer program to the read-once memory container and write a validity indicator associated with the data to the read-once memory container;
permit the second computer program to access the validity indicator and the data;
execute the second computer program to determine that the validity indicator is valid; and
responsive to the validity indicator being valid, execute the second computer program to use the data to perform a function.

18. A method, comprising:
allocating, in memory, a read-once memory container to store data from a first computer program;
writing the data from the first computer program to the read-once memory container;
permitting a second computer program to, within a threshold time of the data being written to the read-once memory container, use the data as stored in the read-once memory container, wherein the data, upon being accessed from the read-once memory container, is not readable again from the read-once memory container without being written again; and
responsive to the threshold time ending without the second computer program accessing the data from the read-once memory container, removing the data from the read-once memory container.

19. The method of claim 18, comprising:
writing the data from the first computer program to the read-once memory container and writing a validity indicator associated with the data to the read-once memory container;
permitting the second computer program to access the validity indicator and the data;
executing the second computer program to determine that the validity indicator is valid;
responsive to the validity indicator being valid, executing the second computer program to use the data to perform a function; and
responsive to determining that the validity indicator is not valid, presenting on a display a notification indicating that the data validity indicator is not valid.

20. The method of claim 18, comprising:
encrypting the data prior to writing the data as encrypted to the read-once memory container.

* * * * *